United States Patent [19]

Ito et al.

[11] Patent Number: 4,901,175
[45] Date of Patent: Feb. 13, 1990

[54] MAGNETIC HEAD SUPPORTING DEVICE

[75] Inventors: Yoshiaki Ito; Joichiro Ezaki; Katsuhiko Tomita, all of Tokyo, Japan

[73] Assignee: TDK Corporation, Tokyo, Japan

[21] Appl. No.: 206,121

[22] Filed: Jun. 13, 1988

[30] Foreign Application Priority Data

Jun. 26, 1987 [JP] Japan ............................. 62-99169[U]

[51] Int. Cl.$^4$ .......................... G11B 5/60; G11B 2/21
[52] U.S. Cl. .................................... 360/103; 360/104
[58] Field of Search ................................ 360/103, 104

[56] References Cited

U.S. PATENT DOCUMENTS

| 4,167,765 | 9/1979 | Watrous | 360/103 |
| 4,620,251 | 10/1986 | Gitzendanner | 360/103 |
| 4,783,710 | 11/1988 | Salyer et al. | 360/104 |
| 4,796,122 | 1/1989 | Levy et al. | 360/104 |

Primary Examiner—Robert S. Tupper
Attorney, Agent, or Firm—Oblon, Spivak, McClelland, Maier & Neustadt

[57] ABSTRACT

In a magnetic disk supporting device of a type that the longitudinal direction of the supporting device extends in the tangential direction of the tracks of a magnetic disk, the direction of float rails on the slider of the magnetic head is the same as the longitudinal direction of the supporting device, and the slider is fixed to the lower surface of a central tongue portion constituting a part of the supporting device at a position that the front end of the slider does not overlap with a lateral frame as a part of the supporting device, whereby stable operation of the magnetic head can be obtained.

3 Claims, 7 Drawing Sheets

MAGNETIC HEAD SUPPORTING DEVICE

BACKGROUND OF THE INVENTION

FIELD OF THE INVENTION

The present invention relates to a magnetic head supporting device. More particularly, it relates to such a type device wherein the longitudinal direction of the supporting device extends in the tangential direction of the tracks of a magnetic head.

DISCUSSION OF BACKGROUND

There has been known a magnetic head supporting device comprising a positioning unit, a magnetic head supporter having an end fixed to the positioning unit, a flexible piece having an end fixed to the supporter, which comprises at its free end side a pair of flexible outer frame portions, a lateral frame portion connecting both free ends of the flexible outer frame portions, and a central tongue portion having an end fixed to the central portion of the lateral frame portion to extend toward the supporter in substantially parallel to the flexible outer frame portions and a loading projection attached to the upper surface of the central tongue portion or the lower surface at the terminal portion of the supporter, whereby a load is applied to a magnetic head from the terminal portion of the supporter to the central tongue portion.

In a magnetic head supporting device, there is a requirement that when the magnetic head follows the tracks of the magnetic disk with a predetermined air gap but keeping a closer relation, the slider carrying the reading and writing elements and the supporter undergo a pitching motion with respect to the first axis and a rolling motion with respect to the second axis intersecting perpendicularly to the first axis, whereby forces applied to the supporter in the radial and circumferential directions are minimized to thereby remove uneven swinging motion.

As the magnetic head supporting device, there are known ones disclosed in, for instance, Japanese Examined Patent Publication No. 22827/1983 and Japanese Unexamined Patent Publication No. 93868/1986.

FIG. 3 is a diagram showing the relation between the conventional magnetic head supporting device and a magnetic disk. In FIG. 3, a reference numeral 1 designates a magnetic disk, a numeral 2 designates a magnetic head supporting device, and a numeral 3 designates a positioning unit.

The magnetic disk 1 is driven in the direction of an arrow mark a by a driving unit (not shown). The magnetic head supporting device 2 is held by the positioning unit 3 so that it is driven linearly in the direction of an arrow mark b1 or b2, namely, in the radial direction along the diameter $O_1$ of the rotating magnetic disk 1, and is positioned on a predetermined track so that writing operation to the magnetic disk 1 or reading operation from the disk 1 are carried out.

The magnetic head supporting device 2 comprises a supporter 22 made of a flexible thin metallic plate in an elongated form, one end of which is fixed to a rigid arm 21, which is in turn attached to the positioning unit 3, by means of fastening means 211, 212 such as screws. The other end in the longitudinal direction of the supporter 22 which constitutes a free end is attached with a flexible piece 23 made of the same thin metallic plate. A magnetic head 24 is attached to the lower surface of the flexible piece 23. The supporter 22 comprises a flexible spring portion 221 which constitutes a portion connected to the rigid arm 21. A rigid beam portion 222 is formed integrally with the flexible spring portion 221. The rigid beam portion 222 is provided with at both sides with flanges 222a, 222b formed by bending both side portions of the rigid beam portion and provides a loading force which pushes the magnetic head 24 to the magnetic disk 1.

FIG. 4 is a front view showing a structure for fitting the flexible piece 23 to the supporter 22, and FIG. 5 is a bottom view of the flexible piece 23 as viewed from the magnetic head.

The flexible piece 23 comprises a flexible flat portion, a pair of flexible outer frame portions 231, 232 formed integrally with both edges of the flat plate portion to extend substantially parallel to the axial line $O_2$ in the longitudinal direction of the supporter 22, a lateral frame 233 connecting both ends of the pair of flexible outer frame portions 231, 232 at positions apart from the supporter 22, and a central tongue portion 234 which has an end connected to the intermediate portion of the lateral frame 233 and a free end extending toward the supporter substantially parallel to the flexible outer frame portions 231, 232. The flexible piece 23 is connected to the terminal end of the supporter 22 by means of spot welding indicated by symbols A.

A loading projection 235 in a semi-spherical form is provided on the upper surface of the central tongue portion 234 of the flexible piece 23 so that a loading force is transmitted from the terminal end of the supporter 22 to the central tongue portion 234. The loading projection 235 may be provided on the lower surface of the terminal portion of the supporter 22.

The magnetic head 24 is attached to the lower surface of the central tongue portion 234 by means of, for instance, bonding.

FIGS. 6, 7 and 8 are, respectively, a front view, a bottom view and a left side view of the magnetic head. The magnetic head 24 is provided with a slider 241 made of a material such as alumina. A pair of float rails 242, 243 are formed in a surface of the slider 241 with a distance so as to face the magnetic disk 1. A reading element 244 and a writing element 245 as thin film type magnetic head elements are respectively attached to the end portions of the rails 242, 243. Each of the rails 242, 243 is provided with each tapered surface 246 or 247 at a position opposite the reading or writing element 244, 245 to produce a dynamic pressure Generally, in the magnetic head 24, the length $l_1$ along the extension of the rails is made greater than the width $l_2$ in a direction perpendicular to the extension of the rails.

In the conventional magnetic supporting device, the magnetic head 24 is mounted on the flexible piece 23 so that the direction of the extension of the rails 242, 243 of the magnetic head is perpendicular to the longitudinal direction of the supporter 22, and the upper surface of the slider, namely the surface opposite the rails 242, 243 is fixed to the lower surface of the central tongue portion 234 by means of bonding, as shown in FIGS. 9 and 10. The width $l_2$ of the magnetic head is made smaller than the effective length of the central tongue portion 234. Accordingly, the width $l_2$ falls within the effective length of the central tongue portion 234. The effective length L of the central tongue portion 234 is so made as to correspond to the width $l_2$, and accordingly, it is smaller than the length of the slider in the direction of the extension of the rails.

For the purpose of miniaturization of the magnetic disk device, there has been proposed system as shown in FIG. 11, wherein only an arm assembly consisting of the supporter 22 and the flexible piece 23 is arranged at a position which is angularly rotated by 90° from the position as shown in FIG. 3, without changing the posture of the magnetic head 24 with respect to the magnetic disk 1. Namely, the direction of extension of the rails of the slider 241 is in alignment with the longitudinal direction $O_2$ of the arm assembly. Further, the arm assembly is turnable in the directions of $C_1$, $C_2$ so that the magnetic head 24 is moved along the diameter of rotation $O_1$ in a non-linear fashion on the magnetic disk 1 to thereby be determined its position.

However, since the effective length L of the central tongue portion 234 of the flexible piece 23 corresponds to the dimension of the width $l_2$ of the magnetic head in the conventional magnetic head supporting device, when the positioning system as shown in FIG. 11 is employed, the end portion of the slider 241 of the magnetic head 24 reaches the lateral frame 233 of the supporter 22, whereby the correct posture controlling operation for the magnetic head can not be obtained.

SUMMARY OF THE INVENTION

It is an object of the present invention to provide a magnetic head supporting device capable of correctly controlling the posture of the magnetic head.

The foregoing and the other objects of the present invention have been attained by providing a magnetic head supporting device of a type that the longitudinal direction of the supporting device extends in the tangential direction to the tracks of a magnetic disk, which comprises a supporter having a flexible spring portion and a rigid beam portion contiguous to the flexible spring portion; a flexible piece having a flexible flat portion extending in substantially parallel to the longitudinal direction of the supporter, a pair of flexible outer frame portions extending from the both edges of a free end of the flexible piece in parallel to the longitudinal direction of the supporter, a lateral frame portion connecting the free ends of the pair of flexible outer frame portions, and a central tongue portion formed by a substantially rectangular flexible plate which has one end fixed to the intermediate part of the lateral frame portion and the other end extending inside and substantially parallel to the pair of flexible outer frame portions to form a free end, the flexible piece having the other end fixed to the terminal portion of the supporter; a loading projection attached to the upper surface of the central tongue portion or the lower surface of the terminal portion of the supporter to transmit a loading force at the terminal portion of the supporter to the central tongue portion; and a magnetic head with a slider attached to the lower surface of the central tongue portion, wherein the slider with float rails and reading/writing elements is placed in such a manner that the float rails extend in the same direction as the longitudinal direction of the supporter and the front end of the float rails of the slider does not overlap with the lateral frame portion.

BRIEF DESCRIPTION OF THE DRAWINGS

A more complete appreciation of the invention and many of the attendant advantages thereof will be readily obtained as the same becomes better understood by reference to the following detailed description when considered in with the accompanying drawings, wherein.

DESCRIPTION OF PREFERRED EMBODIMENT

An embodiment of the present invention will be described with reference to the drawings.

Figure 1:
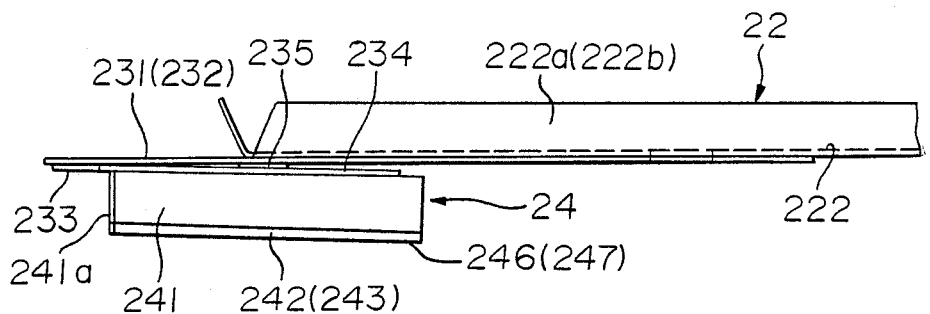
FIG. 1 is a front view showing an important part of an embodiment of the magnetic head supporting device according to the present invention.
Figure 2:
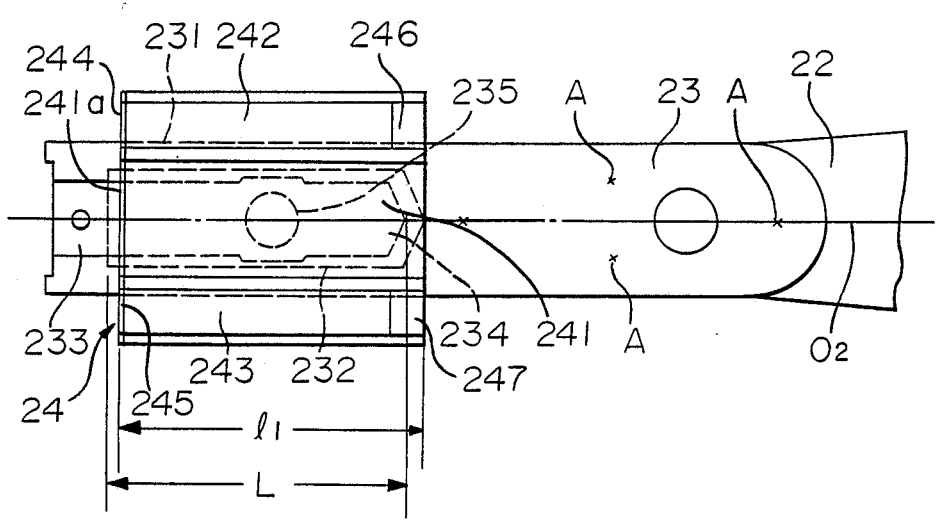
FIG. 2 is a bottom view of the supporting device shown in FIG. 1.
Figure 3:
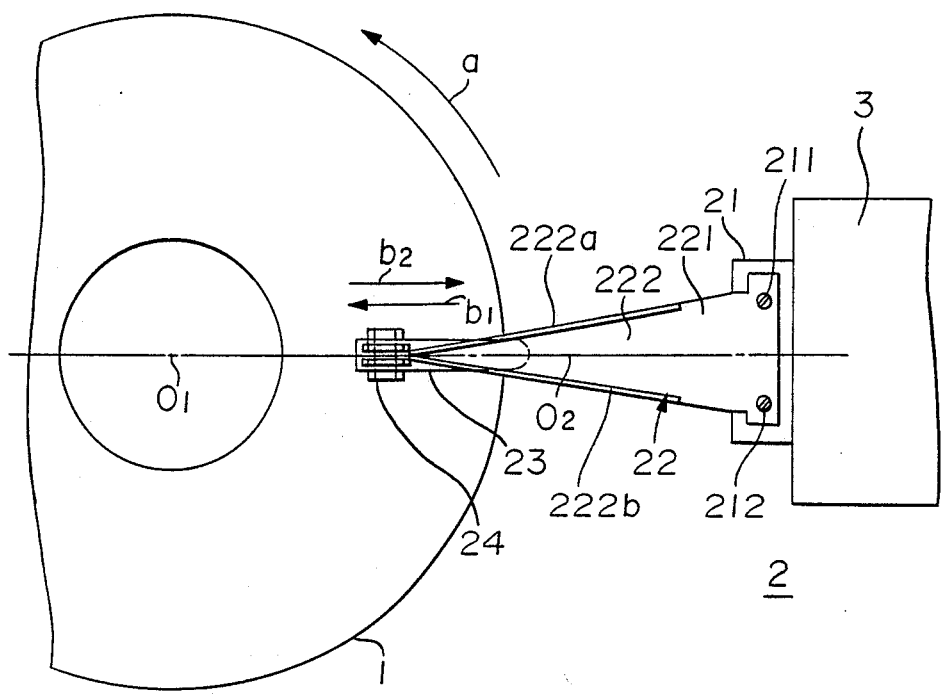
FIG. 3 is a diagram showing the relation of the conventional magnetic head supporting device and a magnetic disk.
Figure 4:
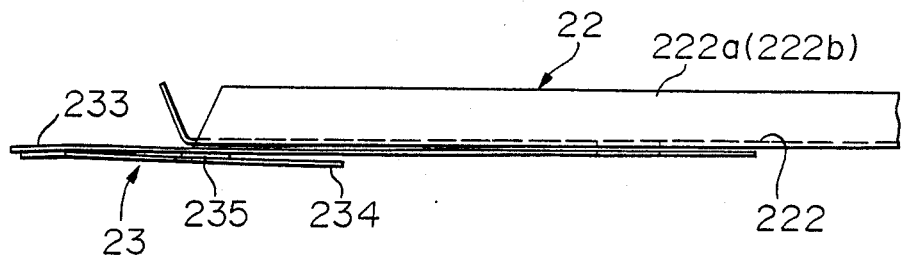
FIG. 4 is a front view showing a typical construction of an assembly of a supporter and a flexible piece.
Figure 5:
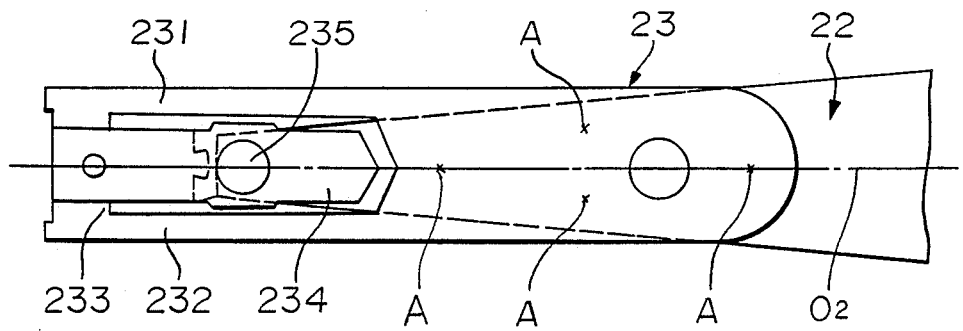
FIG. 5 is a bottom view of the assembly shown in FIG. 4.
Figure 6:
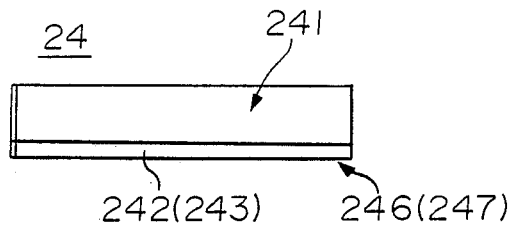
FIG. 6 is a front view of a typical magnetic head.
Figure 7:
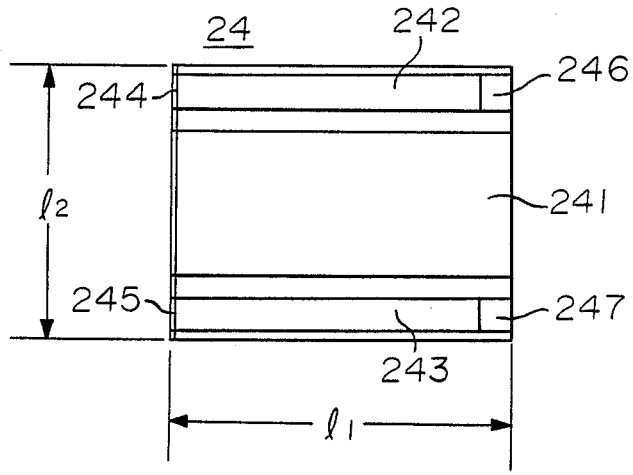
FIG. 7 is a bottom view of the magnetic head shown in FIG. 6.
Figure 8:
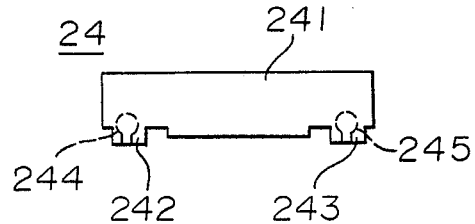
FIG. 8 is a left side view of the magnetic head.
Figure 9:
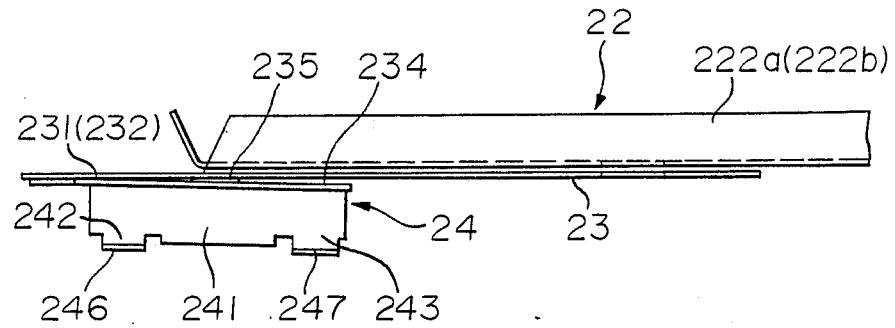
FIG. 9 is a front view showing an important part of the conventional magnetic head supporting device.
Figure 10:
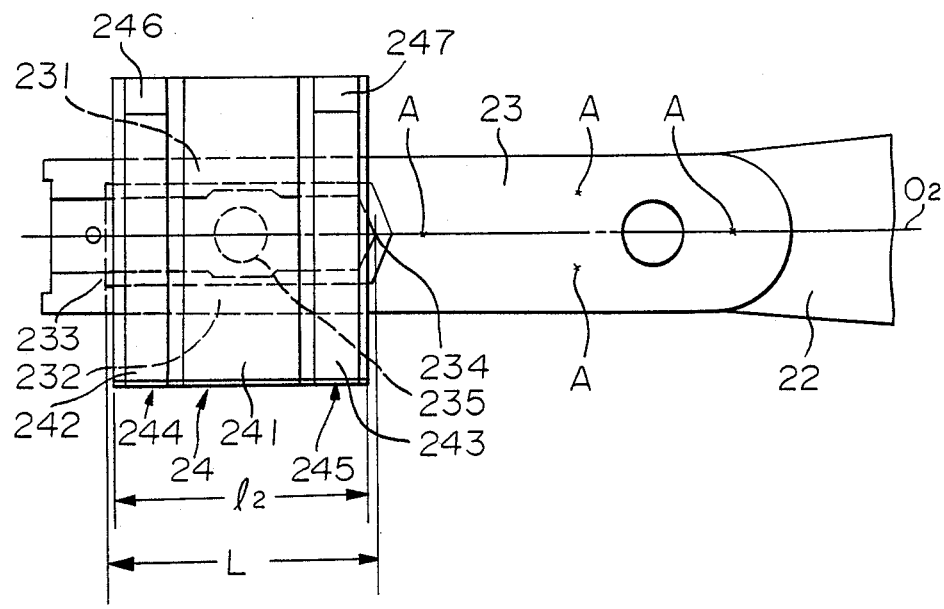
FIG. 10 is a bottom view of the supporting device shown in FIG. 9.

FIG. 1 is a front view of an embodiment of an important part of the magnetic head supporting device of the present invention and FIG. 2 is a bottom view of the supporting device shown in FIG. 1, wherein the same reference numerals designate the same or corresponding parts, and therefore, description of these parts is omitted.

In this embodiment, the magnetic head 24 is attached to the lower surface of the central tongue portion 234 in such a manner that the direction of extension of the float rails 242, 243 formed in the slider 241 is the same as the axial line $O_2$ in the longitudinal direction of the supporter 22, and the end portion 241a of the slider is inside the inner edge of the lateral frame 233 of the flexible piece 23, namely, the end portion of the slider does not overlap with the lateral frame 233. Specifically, the length in the longitudinal direction of the central tongue portion is substantially equal to the length in the direction of extension of the float rails of the slider. In more preferred embodiment, the rear end of the slider corresponds to the free end of the central tongue portion and the front end of the slider and the inner edge of the lateral frame portion form a small space therebetween.

Figure 11:
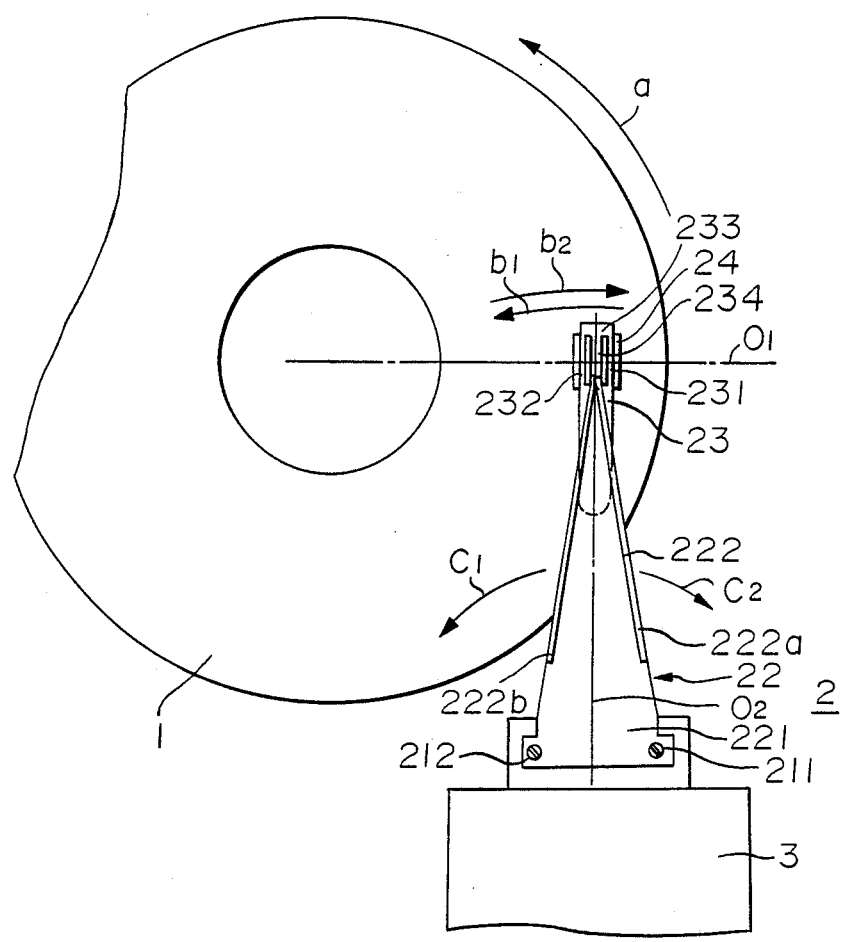
FIG. 11 is a diagram showing the relation of the magnetic head device and a magnetic disk.
Figure 12:
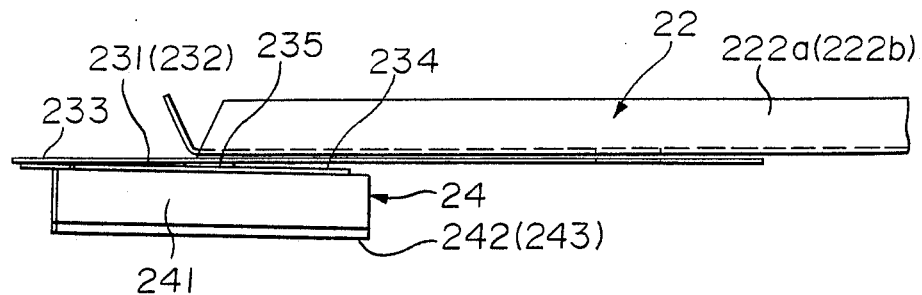
FIG. 12 is a front view of the magnetic head supporting device shown in FIG. 11.
Figure 13:
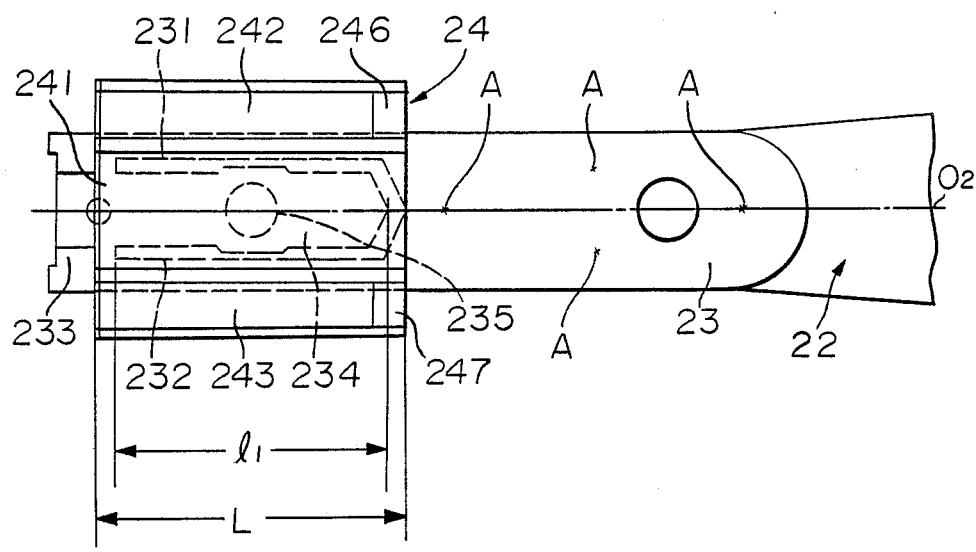
FIG. 13 is a bottom view of the supporting device shown in FIG. 12.

With the construction as described above, the slider 241 of the magnetic head 24 is movable integrally with the central tongue portion 234 without touching the lateral frame portion 233. Accordingly, when the magnetic head supporting device is applied to the system as shown in FIG. 11, a stable pitching motion and rolling motion can be obtained, and forces applied to the supporter 22 in the radial and circumferential directions can be minimized, so that uneven swinging motions can be eliminated.

Thus, in the present invention, a magnetic head supporting device which can correctly control the posture of the magnetic head can be obtained by arranging the direction of extension of the floating rails of the slider to be in alignment with the longitudinal axial line of the supporter and by positioning the slider on the central tongue portion so that the front end of the slider does not overlap with the lateral frame portion.

Obviously, numerous modifications and variations of the present invention are possible in light of the above teachings. It is therefore to be understood that within the scope of the appended claims, the invention may be practiced otherwise than as specifically described herein.

What is claimed is:

1. A magnetic head supporting device of a type wherein the longitudinal direction of the supporting device extends in the tangential direction to the tracks of a magnetic disk, and which comprises:

a supporter having a flexible spring portion and a rigid beam portion contiguous to said flexible spring portion;

a flexible piece having a flexible flat portion extending substantially parallel to the longitudinal direction of said supporter, a pair of flexible outer frame portions extending from both edges of a free end of said flexible piece and parallel to the longitudinal direction of said supporter, a lateral frame portion connecting the free ends of said pair of flexible outer frame portions, and a central tongue portion formed of a substantially rectangular flexible plate which has one end fixed to the intermediate part of said lateral frame portion and the other end extending inside and substantially parallel to said pair of flexible outer frame portions to form a free end, said flexible piece having the other end fixed to said supporter;

a loading projection attached to the upper surface of said central tongue portion or the lower surface of the terminal portion of said supporter to transmit a loading force at the terminal portion of said supporter to said central tongue portion; and a magnetic head with a slider attached to the lower surface of said central tongue portion, wherein the slider includes float rails and reading/writing elements and is placed in such a manner that the float rails extend in the same direction as the longitudinal direction of said supporter and the front end of the float rails of said slider does not overlap with said lateral frame portion.

2. The magnetic head supporting device according to claim 1, wherein the length in the longitudinal direction of said central tongue portion is substantially equal to the length of said slider in the direction of said float rails.

3. The magnetic head supporting device according to claim 2, wherein the rear end of said slider corresponds to the free end of said central tongue portion and the front end of the slider and the inner edge of said lateral frame portion form a small space therebetween.

* * * * *